July 31, 1956  C. SCHULTZ  2,757,042
BOWLESS COLLAPSIBLE TRUCK COVER
Filed July 20, 1953  3 Sheets-Sheet 1
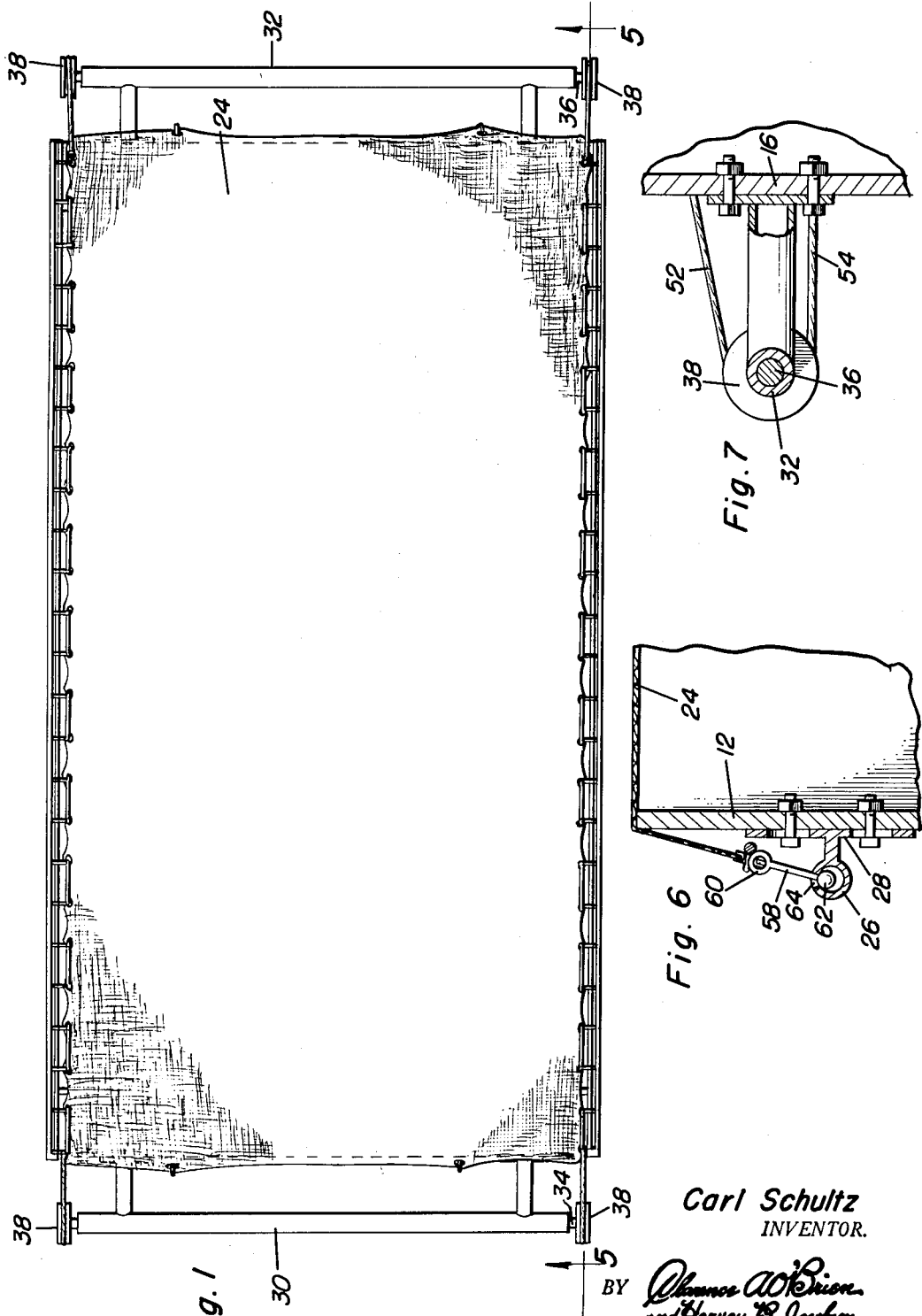
Carl Schultz
INVENTOR.

July 31, 1956 — C. SCHULTZ — 2,757,042
BOWLESS COLLAPSIBLE TRUCK COVER
Filed July 20, 1953 — 3 Sheets-Sheet 2
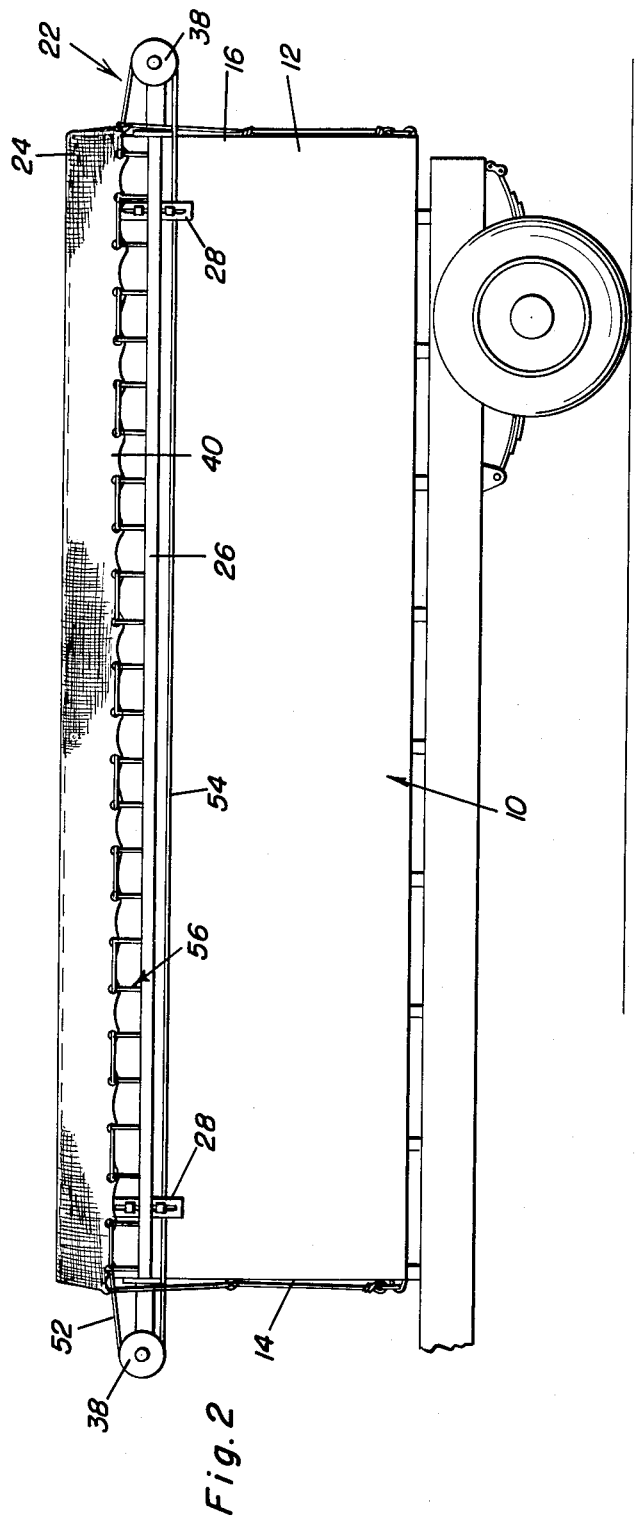
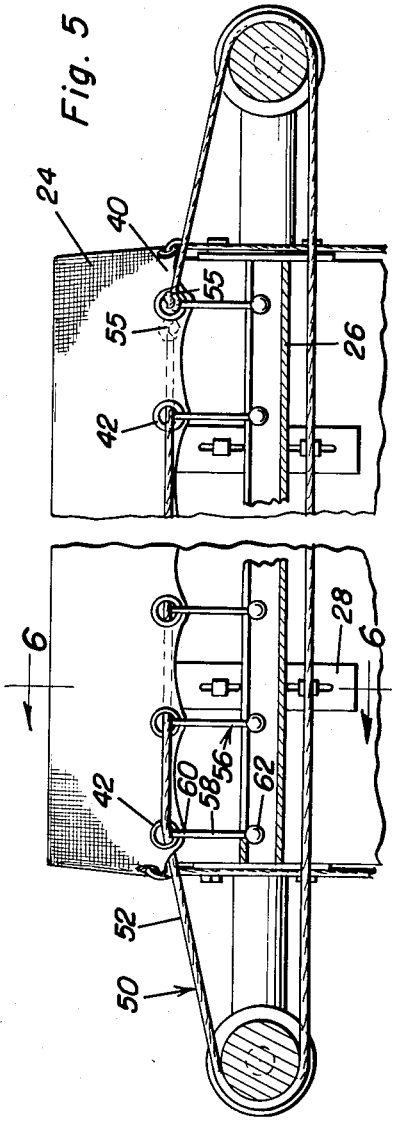
Carl Schultz
INVENTOR.

July 31, 1956　　　　C. SCHULTZ　　　　2,757,042
BOWLESS COLLAPSIBLE TRUCK COVER
Filed July 20, 1953　　　　　　　　　　　3 Sheets-Sheet 3
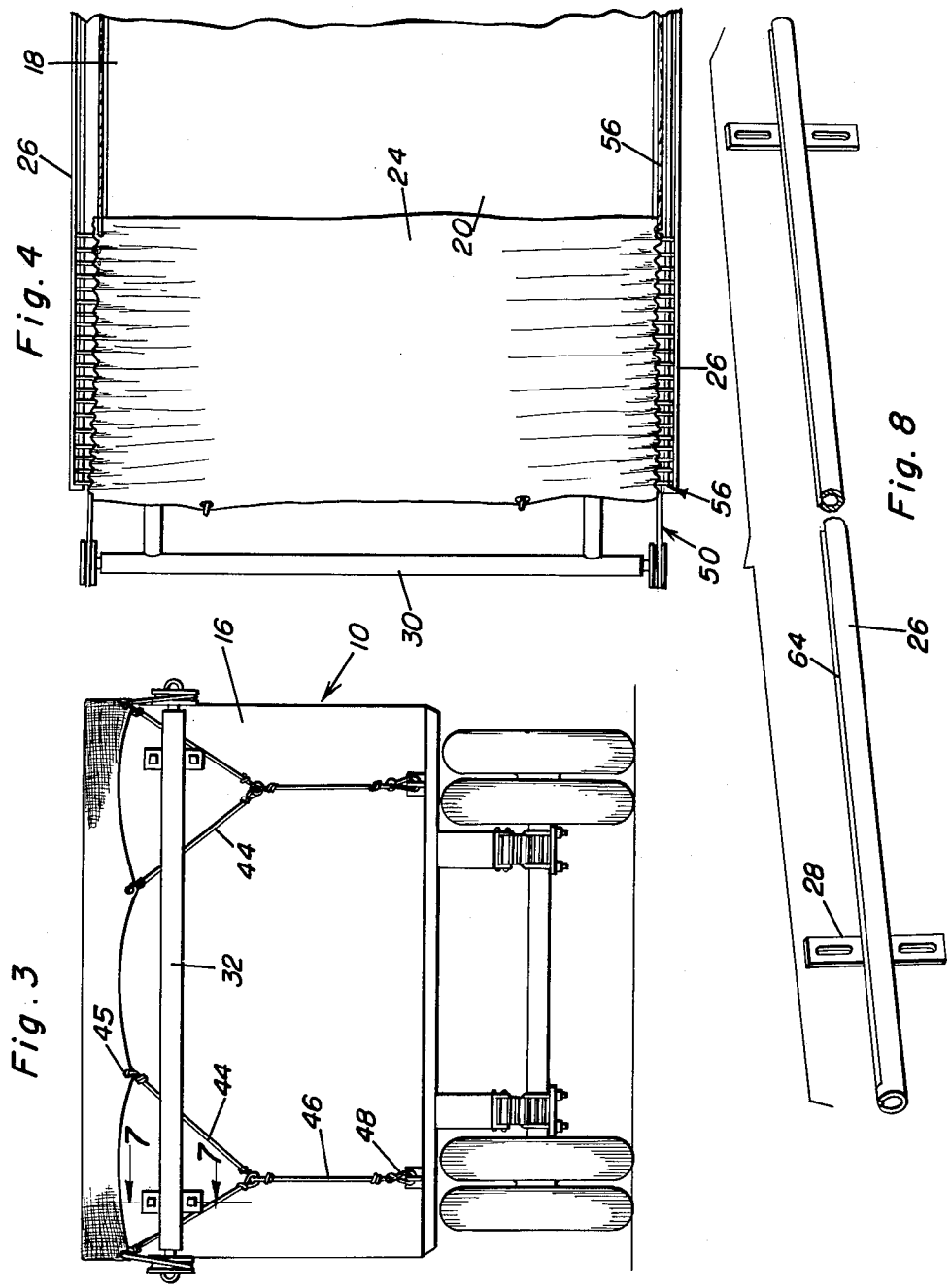
Carl Schultz
INVENTOR.

United States Patent Office 2,757,042
Patented July 31, 1956

2,757,042

BOWLESS COLLAPSIBLE TRUCK COVER

Carl Schultz, Fargo, N. Dak., assignor of one-half to Hal Stefanson, Fargo, N. Dak.

Application July 20, 1953, Serial No. 368,970

2 Claims. (Cl. 296—100)

The present invention relates to covers for open bed truck bodies and more particularly relates to a means for attaching such covers to the truck bodies.

The primary object of the invention is to provide a cover attachment that will permit the free sliding movement of a collapsible cover over the bed of a truck to alternatively cover and expose the truck bed without the necessity for removing the cover from the truck body.

A very important object of the invention is to provide a means for slidably mounting a truck cover over the open bed of a truck which includes a novel hold-down fastening arrangement, which need not be detached from the cover but which may be permitted to slide with the cover from its collapsed to its extended position.

Yet another object of the invention is to provide a novel cover attachment means that will constitute a positive hold down arrangement for the cover as well as serve as a means for extending and collapsing the cover.

A still further object of the invention is to provide a cover attachment assembly for open bed trucks that is quick and simple to mount on the truck body, which is extremely inexpensive to produce, which will not interfere with the normal operations of dumping and loading the truck and which may be detachably or permanently applied to conventional truck bodies.

These, together with various ancillary objects and features which will later become apparent as the following description proceeds, are attained by this invention, a preferred embodiment of which is shown by way of example only in the accompanying drawings, wherein:

Figure 1 is a top plan view of an open bed truck body to which the attaching means of the present invention is applied with the cover in its extended or covering position;

Figure 2 is a side elevational view of the truck body with the collapsible cover attached thereto in extended position by means of the attachment assembly;

Figure 3 is a rear elevational view of the back end of the truck body disclosing the manner of securement of the cover thereto;

Figure 4 is a top plan view of the truck body with the cover being shown in its collapsed position;

Figure 5 is an enlarged detail view, with certain parts being shown in cross section for clarity of detail, of the slidable mounting of the hold down fasteners to the attachment assembly in the arrangement of the means for collapsing and extending the cover;

Figure 6 is a cross sectional view taken substantially along section line 6—6 of Figure 5;

Figure 7 is a cross sectional view taken substantially along the plane of section line 7—7 of Figure 3; and Figure 8 is an enlarged perspective view of one of the track members of the cover attaching assembly.

Referring now to the accompanying drawings in detail wherein like reference numerals are utilized to designate similar parts throughout the various views, attention is first directed to Figures 1–3 wherein the open bed truck body is designated in its entirety by the numeral 10.

The body 10 is of the conventional type, including sides 12, front end 14, back end 16 and having an open top 18, to expose the bottom 20 of the body to facilitate loading. These bodies are widely used to haul grain and the like. However, when hauling grain in these bodies, considerable loss of the grain is caused by air suction drawing the grain out of the trucks, which loss is due in many cases to inadequate cover tie-down means or because the bodies lack covers completely due to their time-consuming attachment and inconvenience.

The present invention relates to a novel attachment assembly 22 for securing a cover 24 on the truck body which will positively hold down the side edges of the cover to prevent loss of grain through air suction and which will permit the cover to be collapsed and extended over the truck body without the necessity of disconnecting or otherwise disturbing the connection of the hold down means on the attachment to the cover.

The attachment assembly 22 comprises generally a pair of elongated tubular track members 26 which are secured to the sides 12 of the body 10 throughout the length of these sides and spaced somewhat below the upper edges of these sides. Suitable brackets 28 are secured to the track members 26 to mount the same on the sides 12 of the truck body 10.

To the front and rear ends 14 and 16 respectively of the body 10 are secured elongated sleeves 30 and 32 respectively which extend transversely across the ends substantially the entire width of the body.

Axles 34 and 36 extend rotatably through the sleeves 30 and 32 respectively and have their ends projecting from the ends of the sleeves. Sheaves 38 are mounted on the ends of the axles 34 and 36 and are in substantial alignment with the ends of the tubular track members 26 on the sides 12 of the body.

The cover 24 is preferably the conventional canvas tarpaulin having its side edges 40 provided with longitudinally spaced attachment eyelets 42 throughout the length of the cover.

Suitable tie-down straps or ropes 44 (Figure 3) are provided at the front and rear ends of the cover 24 through suitable eyelets 45 spaced along the front and back ends of the cover. As will be noted in Figure 3, the ropes 44 converge from the ends of the cover toward one another with each pair of straps 44 joining a common strap 46, which strap is in turn suitably secured as at 48 to the ends 14 and 16 adjacent the bottom edges thereof. With this arrangement when the cover 24 is in its extended position as shown in Figure 1, the front and rear ends thereof are secured positively against movement.

To provide a means for extending and collapsing the cover 24 and to assist in holding the side edges of the cover adjacent the sides 12 of the body 10, an endless cable 50 is entrained over the sheaves 38 disposed at each side of the body 10. As shown, each cable 50 has its upper run 52 overlying and being substantially parallel to a track member 26 and has its lower run 54 disposed below each track member 26. The upper run 52 of each of the cables 50 is threaded slidably through the eyelets 42 in the side edges 40 of the cover 24 to assist in holding the same in juxtaposition with the sides 12 of the body. Also, the upper run 52 of each cable is knotted as at 55 on opposite sides of the eyelet 42 on each side edge of the cover 24 adjacent the rear end of the cover to positively secure the upper run of each cable to this end of the cover. At all other points, the cable is slidably threaded through the eyelets. Thus, upon rotation of one of the sheaves 38, which rotation is immediately transmitted to the sheave on the opposite side of the body, the cable is moved either forwardly or rearwardly with respect to the body to extend and collapse the cover 24.

However, the cables 52 are not in themselves sufficient to retain the hold down characteristics necessary on the side edges of the cover 24 and additional hold down means in the form of hold down fasteners 56 are provided along the side edges 40 of the cover 24.

The hold down fasteners 56 each comprise a shank or stem 58 having a hook 60 at its upper end engaged through an eyelet 42 in the side edge of the cover and being provided with a ball shaped enlargement 62 at its lower end to permit the slidable mounting of the hold down fasteners 56 in the track members 26.

To permit this sliding attachment thereto, the track members 26 are each provided with a longitudinally extending upwardly opening slot 64 which opens into the rear end of the track member and terminates just short of the front end of the track member whereby the track member constitutes in effect the split sleeve.

The ball shaped lower ends 62 of the fasteners 56 are disposed within the open end of the slot 64 and ride within the tubular trackway 26 abutting the wall of each member 26 on opposite sides of the slot 64. The stems 58 project upwardly through the slot 64 of each track member 26 and, as noted hereinbefore, the hooked upper ends 60 of the fasteners are engaged through the eyelets 42 on the cover 24.

With this arrangement, as the cable 50 is pulled, on either side of the body, and the cover 24 collapsed to the position shown in Figure 4, the hold down fasteners 56 ride along their respective track members 26 and permit the complete collapsing of the cover without the necessity for disturbing their connection to either the cover or the track members 26 in any manner. It is to be understood, of course, that prior to collapsing the cover 24, the straps 46 at the rear end 16 of the body 10 must first be disconnected from their attaching brackets 48.

When it is desired to completely remove the cover 24 from the top of the bed, the straps 46 at the front end 14 of the body as well as the straps 46 at the rear end 16 of the body are detached therefrom, the cables 50 unknotted and the cover simply slid off the rear end of the truck with the hold down fasteners 56 being pulled through the open ends of the track members 26.

Thus, it can be seen that the present invention provides a novel and extremely practical means for securing a collapsible cover over the top of an open bed truck body and eliminates to a very great degree the time consuming tie down means now utilized to hold such covers in place and to release such covers from their tied down position.

However, since numerous modifications and changes will readily occur to those skilled in the art, after a careful consideration of the foregoing specification taken in conjunction with the accompanying drawings, it is not desired to limit the invention to the exact construction shown and described. But, all suitable modifications may be resorted to which fall within the scope of the appended claims.

What is claimed as new is as follows:

1. A truck cover attachment for open bed truck bodies comprising elongated tubular side members for attachment substantially along the length of the side walls of the truck body, rotatable end support shaft members for attachment transversely of the ends of the truck body, sheaves on opposite ends of said support shaft members for alignment with said elongated tubular members, a flexible truck body cover for overlying the bed of the truck body, each tubular member including an upwardly opening longitudinally disposed slot portion communicating with the interior thereof, said flexible cover including a plurality of oppositely disposed eyelet portions spaced along opposite side edges of said flexible cover, cover fasteners including a stem portion extending into the longitudinally extending slot portions of said tubular side members and including a ball-shaped enlargement at one end slidably retained within said tubular members, said stem including an eye portion opposite said ball-shaped enlargement maintained in an eyelet portion of said flexible cover, endless cables entrained over said sheaves, each of said cables having its upper run slidably threaded through the eyelet portions of the side edges of the cover, and stop means securing each of said cables to one end of said cover whereby movement of the cables will extend and collapse the cover.

2. In combination with a collapsible truck cover, including a plurality of spaced eyelet portions disposed along the opposite longitudinal side edges thereof, an attachment for extending and collapsing the cover comprising a pair of elongated track members disposed along the opposite side edges of the cover, sheaves mounted at opposite ends of said track members for rotation about an axis transverse to the longitudinal axis of said track members, endless cables entrained over said sheaves and having one of their runs slidably threaded through the eyelet portions of the opposite side edges of said cover, said cables being secured to one end of said cover, means securing the other end of the cover against movement, hold-down fasteners secured to the opposite side edges of said cover at spaced points throughout the length of the cover, and means slidably mounting said fasteners on said track members whereby the cover will be extended and collapsed upon movement of the cable, said track members being tubular, each tubular track member having an upwardly opening longitudinal slot therein, said hold-down fasteners including a stem portion extending into said upwardly opening longitudinal slot portions, said stem including an enlarged ball-shaped end engaging the inner surface of each tubular member at opposite sides of the slot preventing withdrawal of the fasteners through the slot wherein said ball-shaped ends constitute said slidable means, said stems including eye portions opposite the ball shaped ends, said eye portions extending through the eyelet portions of the truck cover.

References Cited in the file of this patent

UNITED STATES PATENTS

| | | |
|---|---|---|
| 759,628 | Nocolae | May 10, 1904 |
| 1,263,759 | Hanaway | Apr. 23, 1918 |
| 1,376,250 | Camp | Apr. 26, 1921 |
| 2,068,041 | Tate | Jan. 19, 1937 |
| 2,239,888 | Forrester | Apr. 29, 1941 |
| 2,406,737 | Bramble | Sept. 3, 1946 |
| 2,443,478 | Reid | June 15, 1948 |
| 2,558,926 | Bramble | July 3, 1951 |
| 2,559,310 | McNavage | July 3, 1951 |